June 21, 1960 J. P. ECKERT, JR., ET AL 2,942,239

COINCIDENT SIGNAL DEVICE

Filed June 26, 1953 3 Sheets-Sheet 1

*INVENTORS*
JOHN PRESPER ECKERT JR.
DANIEL M. LIPKIN

*ATTORNEY*

United States Patent Office 2,942,239

Patented June 21, 1960

2,942,239

COINCIDENT SIGNAL DEVICE

John Presper Eckert, Jr., Gladwyne, and Daniel M. Lipkin, Philadelphia, Pa., assignors, by mesne assignments, to Sperry Rand Corporation, New York, N.Y., a corporation of Delaware Filed June 26, 1953, Ser. No. 364,382

9 Claims. (Cl. 340—174)

This invention relates generally to coincident signal devices and more particularly to coincident signal devices using materials exhibiting remanent polarization and generally rectangular response characteristics.

Data storage is one of the functions in modern computer, control and communication systems. Electronic trigger pair tubes, rotating drums or tapes, acoustic delay lines or cathode-ray tubes have been used for information storage. Electronic trigger pair storage has poor reliability and is extremely expensive. Acoustic delay line and cathode-ray tube storage systems require constant regeneration to preserve the information stored. All three of these systems lose the information if there is an interruption of power. Magnetic drum or tape storage preserves information indefinitely, but both involve mechanical systems with their associated limitations on operating speed. Both in acoustic delay lines and rotating magnetic drums, the required operation is synchronous; the speed depends upon the physical nature of the system and cannot be changed at will during operation.

Magnetic materials with rectangular hysteresis loops have been suggested for use for digital storage. In such suggestions, the magnetic elements have been arranged in the form of delay lines in which information is stepped from one core to another or in an array wherein information is stored statically and is selectively inserted or read out by means of coincident excitations to the cores in the array, to obtain a large storage capacity characterized by indefinitely long storage requiring no holding power with low access time at low cost.

However, in systems of the latter type it has been necessary to use elements having very nearly rectangular hysteresis characteristics. Departures from rectangularity in known materials have reduced the reliability of such devices or reduced their potential operating speed. The present invention teaches the use of biasing to minimize the undesirable effects of non-rectangularity and increase operating speed.

Accordingly, objects of the invention are:

To provide a biased coincident signal device.

To provide a biased coincident signal device in which bias is provided independently of the coincident signal sources.

To provide a biased coincident signal device in which the bias is provided by the coincident signal sources.

To provide a biased coincident signal device in which all bias is contributed by the coincident signal sources associated with more than one selection dimension.

To provide a coincident signal device in which the discrimination ratio is optimum.

To provide a selection system for a coincident signal storage system which will afford a large ratio between the absolute magnitude of net signals applied to selected and unselected elements.

To provide a coincident signal storage system wherein the storage elements are biased to provide a larger discrimination ratio than is otherwise obtainable.

To provide a coincident signal storage system wherein the storage elements are biased independently of the sources of coincident signals.

To provide a coincident signal storage system wherein the storage elements are biased by the means for applying coincident signals.

To provide a coincident signal storage system wherein the signals applied to selected and unselected lines in certain selection dimensions are of opposite polarity.

To provide a coincident signal storage system wherein the output sensing means comprises the means for applying coincident signals.

To provide a method of sensing the output from a coincident signal device using the means for applying coincident signals.

To provide a coincident signal storage system wherein fewer selection dimensions are used for reading than for recording.

Figures 7A, 7B:
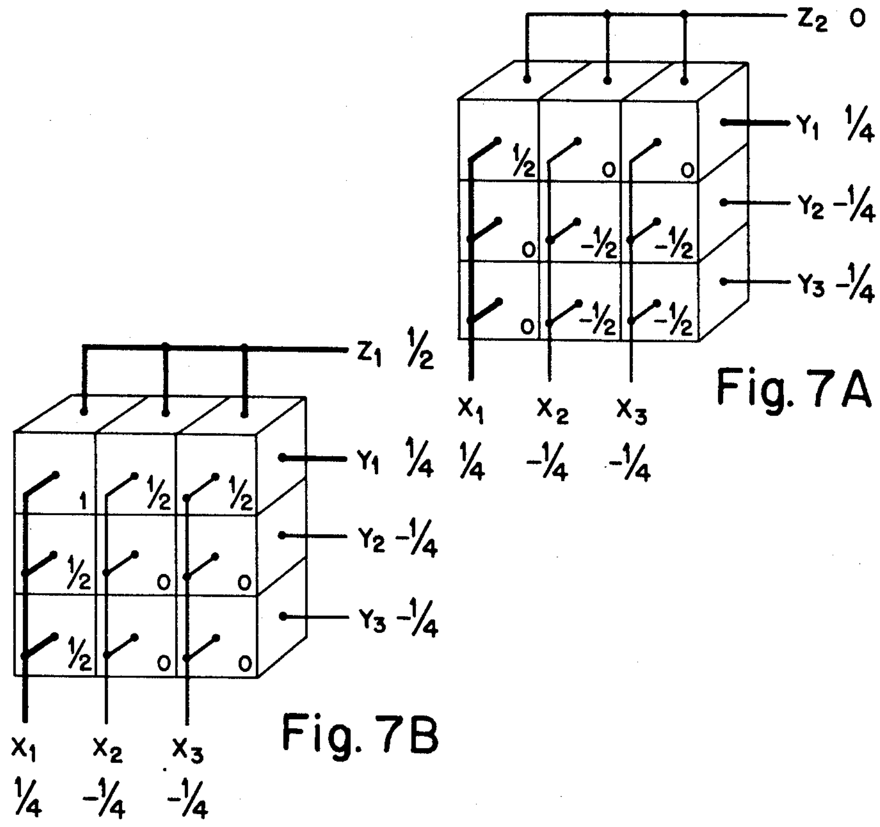
Figure 6:
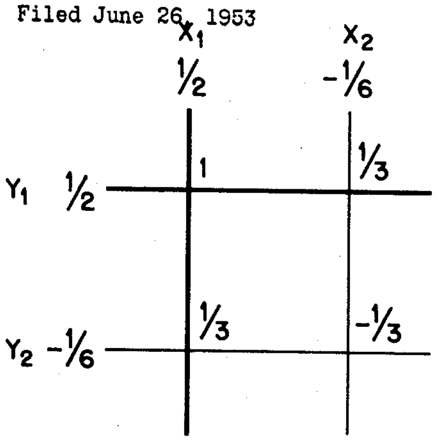

Figure 6 shows a coincident signal storage system wherein bias is contributed solely by the lines associated with one selection dimension; and Figures 7A and 7B show a coincident signal storage system having three selection dimensions wherein bias is contributed by the lines associated with two selection dimensions Figures 7A and 7B each represent a plane of cores in a three-dimensional array and the two figures taken together illustrate an exploded view of such a three-dimensional array.

Figure 8:
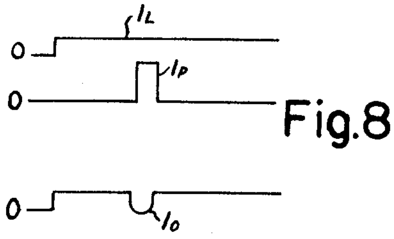

Figure 8 shows the ideal current waveforms obtained in one embodiment of this invention.

It has been found that a small core made of a magnetic material having a nearly rectangular hysteresis loop may be magnetized in one direction or the other, and left that way. This bi-stability, like that of a two-position relay, may be used to express the two digits of the binary system, Zero or One. A number may be stored, or written, by sending a current pulse through a magnetizing coil on the core. Reversing the polarity of this current reverses the core's magnetization. The binary number in the core, represented by the core's flux direction, may be sensed, or read, by observing the voltage induced in a sensing coil when the magnetizing coil carries a current pulse of fixed arbitrary polarity and magnetizing amplitude. Relatively large signal voltages will be induced if the core flux direction is reversed by the read pulse, small ones if it is not.

Figure 1:
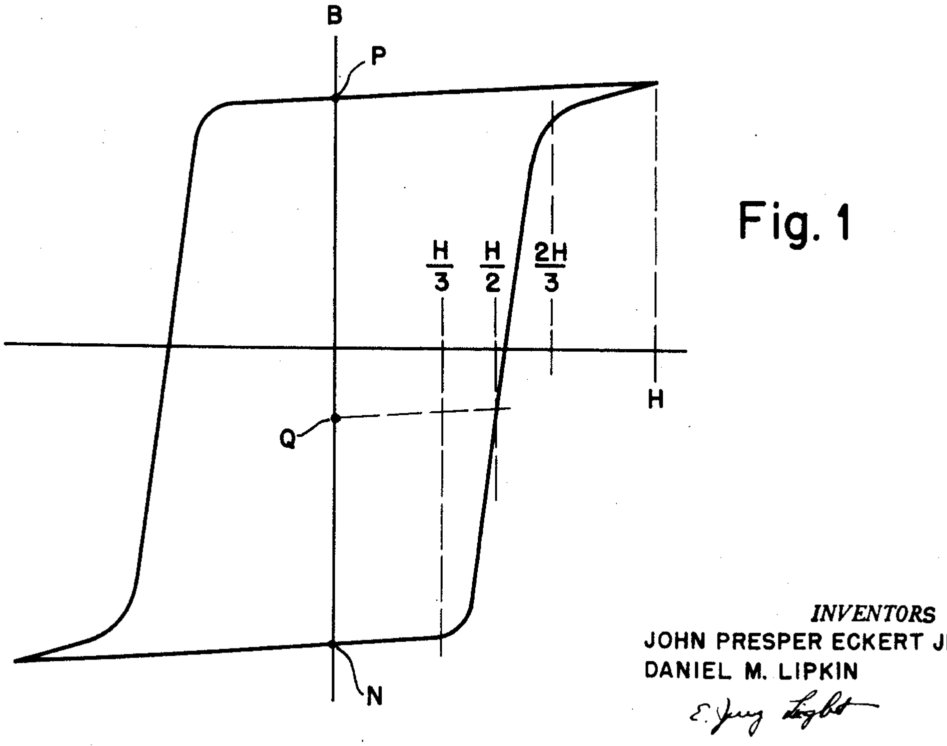
Figure 1 shows a typical rectangular hysteresis loop.

Reference is made to Figure 1 which shows a nearly rectangular hysteresis loop. After a high positive H is applied and then removed, the material will reside in the condition P of Figure 1. Likewise, after a high negative H, the material will reside in condition N. The two conditions P and N, corresponding to the storage of binary digits 0 and 1, or 1 and 0, respectively, will be retained by the core until a magnetizing force exceeding the knee of the hysteresis loop is applied. When a strong positive H is applied to an exciting coil on the core, a detecting coil will show a very small voltage if the core is in condition P and a very large voltage if the core is in condition N. The large signal corresponding to condition N arises from the flux linkages through the detecting coil when the magnetic condition of the core is reversed from N to P.

Figure 2:
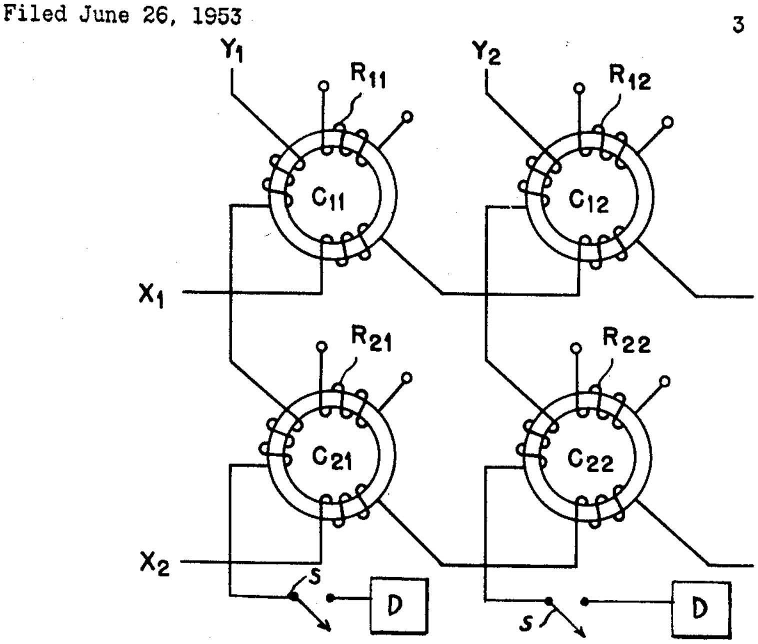
Figure 2 shows a two dimensional storage array comprising four coincident signal elements.

Applications of rectangular hysteresis loop materials to digital storage have been described depending on the response of the core to positive and negative values of $$\frac{H}{2}$$

and positive and negative values of H as indicated in Figure 1. A two-dimensional storage array is illustrated in Figure 2. The magnetic cores or storage elements are presumed to have hysteresis characteristics similar to Figure 1. The $x$ and $y$ circuits are used for selecting elements both for the reading and writing processes and are excited or energized with currents corresponding to positive or negative $$\frac{H}{2}$$

values, as shown in Figure 1. For writing, positive current is circulated through circuits $x_1$ and $y_1$. Core $C_{11}$ will be excited by two coils each carrying a current corresponding $$\frac{H}{2}$$

The resulting H is sufficient to switch the magnetic material to condition P; and the binary digit 1 has been written in core $C_{11}$. During this operation cores $C_{12}$ and $C_{21}$ have each been excited by a single current corresponding to $$\frac{H}{2}$$

while core $C_{22}$ has received no excitation. Referring to Figure 1, it is seen that after putting the core into state N with a full —H energization, excitation by $$\frac{H}{2}$$

moves the core past the knee of the hysteresis loop to a new state Q. Additional applications of $$\frac{H}{2}$$

excitation tend to drive the state of the core up along the B axis, disturbing the information in the element, or, perhaps, destroying that information.

Figure 3:
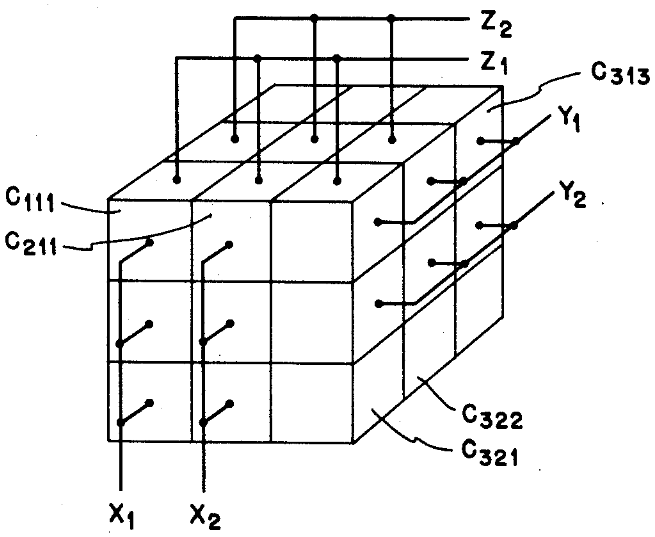
Figure 3 shows a three dimensional storage array comprising nine coincident signal elements.

For a three-dimensional array of elements, considering that the array is physically so arranged, although this is not required or even necessarily preferred, each set of wires would be connected to a plane of elements in the array as represented in Fig. 3. In this figure each small cube in the array is assumed to be a storage element with three exciting windings associated therewith connected respectively to one $x$, one $y$ and one $z$ wire. Accordingly, a selection of an $x$ wire, a $y$ wire and a $z$ wire will be sufficient for locating an element in the array at their intersection. If the selecting circuits are symmetrically excited, $$\frac{H}{3}$$

will be supplied to each of the selecting $x$, $y$ and $z$ wires and no excitation will be supplied to the non-selected wires. The selected element will receive a magnetizing force of H, sufficient to switch that element to condition P of the hysteresis loop of Fig. 1. Of the non-selected elements, those having two selecting wires connected thereto will receive a magnetizing force of $$\frac{2H}{3}$$

those having one selecting wire connected thereto will receive a magnetizing force of $$\frac{H}{3}$$

and those having no selecting wires connected thereto will receive no magnetizing force. It is to be noted that those elements receiving $$\frac{2H}{3}$$

magnetizing force will be driven past the knee of hysteresis loop shown on Figure 1 resulting in a spurious information entry or partial switching of the state of that element.

We may define a quantity, the "discrimination ratio," D, as being the ratio of the maximum value of H used to switch the state of a core to the maximum value of H used to excite the penultimate element in an array (element having all except 1 of the intersecting selecting wires). It can be seen that high values of D have important advantages. With a higher D a material may be used whose hysteresis loop deviates more from rectangularity, since the danger of spurious switching of state of a material diminishes with high values of D. With a material whose hysteresis loop is nearly rectangular higher values of D result in obtaining a higher safety factor, i.e., safety from spurious switching of state. Further, it is to be noted that faster switching of state of a material is obtainable by using a higher maximum value of H for switching of state thereof. Accordingly, a higher D used with a material having a nearly rectangular hysteresis loop permits an increase in the maximum value of H without increasing the danger of spurious switching of state. In the two-dimensional array discussed hereinabove, the discrimination ratio used was $$D=\frac{1}{\frac{1}{2}} \text{ or } D=2$$

and for the three-dimensional array, the discrimination ratio used was $$D=\frac{1}{\frac{2}{3}} \text{ or } D=1.5$$

For best operation of a storage system comprising storage elements as above discussed the possible values of the total of coincident excitations applied to any element must be distributed about zero excitation such that (1) all but one value of coincident excitation must be clustered about zero excitation within some limit, G, to their absolute values, where G represents a magnetizing force which will not be large enough to switch the state of an element even when applied to that element many successive times and (2) the one remaining value of coincident excitation, M, must have an absolute value as large as possible and certainly large enough to switch the magnetization of an element when applied in the correct sense. The above proposition says the discrimination ratio $$D=\frac{M}{G}$$

should be as large as possible.

In order to obtain as large a discrimination ratio as possible, it is the basis of this invention to provide a bias, which connotes a magnetizing force which is supplied equally to all the cores in the array, by whatever means, to achieve the distribution described above. The bias must be of a polarity opposite to the polarity of the coincident excitation M. The magnitude S of the bias required to achieve maximum discrimination ratio may be derived as follows.

Considering an n-dimensional array of elements having n-sets of excitation circuits which are symmetrically excited, the selected element will receive n units of signal excitation minus S units of bias excitation, or a net excitation of $(n-S)$ units, in response to which the core must travel from N to P with reference to the hysteresis loop of Figure 1. The element receiving the next greatest excitation receives a net excitation of $(n-1-S)$ units. The element receiving no units of signal excitation is excited solely by the bias $(-S)$. The following table lists possible excitations which the various elements in the array may receive:

| Number of Units of Signal Excitation Which an Element May Receive | Excitation |
|---|---|
| $n$ | $(n-S)$ |
| $n-1$ | $(n-1-S)$ |
| $n-2$ | $(n-2-S)$ |
| . | . |
| . | . |
| . | . |
| 2 | $(2-S)$ |
| 1 | $(1-S)$ |
| 0 | $(-S)$ |

For the largest discrimination ratio, it can be shown that the absolute value of the ratio between the excitation of the selected or ultimate element to the excitation of the penultimate element be equal to the absolute value of the ratio between the excitation of the selected element to the excitation of the element receiving no selective excitation, or that:

$$\left|\frac{(n-S)}{(n-1-S)}\right|=\left|\frac{(n-S)}{(-S)}\right|$$

whence $$S=\frac{(n-1)}{2} \qquad (1)$$

It is to be understood that the magnitude S of the negative bias, obtained from Equation 1, is measured in the same units used to measure the selective excitations.

The ratio $S'$ of the bias magnitude to the ultimate net excitation $(n-S)$ received by the selected core has the value:

$$S'=\left(\frac{S}{n-S}\right)=\left(\frac{n-1}{n+1}\right) \qquad (2)$$

If the unit of measure of magnetic excitations is replaced by one which is $(n-S)$ times larger, so that the selected core receives just unity excitation in terms of the new unit, then the magnitude of negative bias which maximizes the discrimination ratio will have the numerical values $S'$ given by (2), also in terms of the new unit.

Choosing this latter unit of measure of magnetic excitations for convenience, the discrimination ratio D can be seen to have the value $(1/S')$, or:

$$D=\left(\frac{n+1}{n-1}\right) \qquad (3)$$

It will be shown that (3) gives the maximum value of the discrimination ratio which can be attained by means of a bias as herein provided, for an array of dimension $n$.

Figure 4:
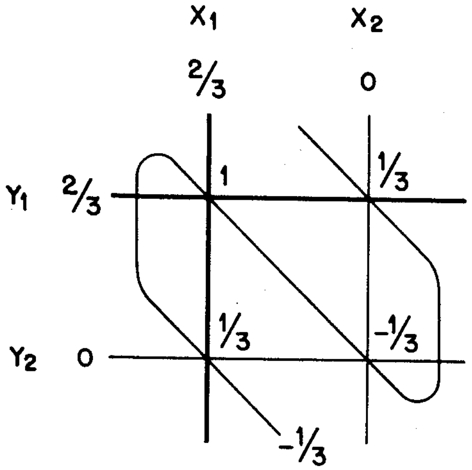
Figure 4 shows a coincident signal storage system using independent biasing means.

This bias may be supplied to each element independently of the signal excitation means. Accordingly, for a two-dimensional array of elements, an additional winding can be included on each element shown in Figure 2 and a bias signal of −⅓ applied thereto with an excitation of ⅔ applied to the selected $x$ and $y$ circuits. This is shown in Figure 4 where the points of intersection of the various lines represent storage elements and the excitation of each such element is numerically shown. However, the bias signal can be applied by using the circuits already present in the array in various ways: all of the bias signal can be supplied to one dimension; the bias signal can be divided equally among the various dimensions; or the bias signal can be divided unequally among the various dimensions: Considering the two-dimensional array, the bias signal of −⅓ could be divided as follows.

Figure 5:
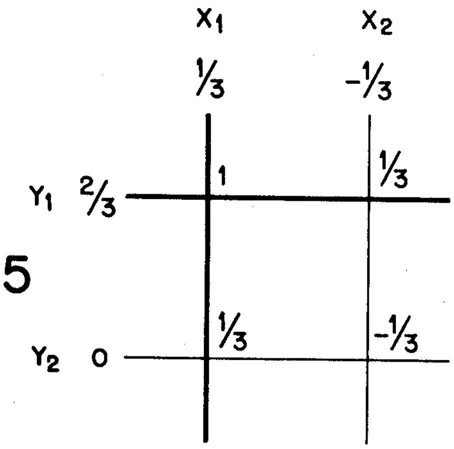
Figure 5 shows a coincident signal storage system wherein bias is contributed equally by the lines associated with the two selection dimensions.

| $x$ circuits | $y$ circuits | |
|---|---|---|
| −1/3 | 0 | ←Fig. 5 |
| −1/4 | −1/12 | |
| −1/6 | −1/6 | ←Fig. 6 |
| −1/9 | −2/9 | |
| 0 | −1/3 | |

It must be understood that the above signal levels are for bias only; the absolute value of excitation on any line is derived by combining the bias with the value of signal applied for selection or non-selection. It must be further understood that the above table lists but a few examples of the divisibility of the bias signal between the $x$ and $y$ circuits in the two-dimensional case where no separate bias wire is used. Figures 5 and 6, depicting the two identified examples of the above table, show the points of intersection of the $x$ and $y$ wires as representing storage elements. The excitations on each line and at each element are shown numerically.

For a three dimensional array, the bias according to Equation 2 is −½ with symmetrical application of ½ to each of the selecting wires. Apportioning the bias among the selecting wires is exemplified by any of the following which include only a small number of possible divisions of the −½ bias signal:

| $x$ circuits | $y$ circuits | $z$ circuits | |
|---|---|---|---|
| −1/2 | 0 | 0 | |
| −1/4 | −1/4 | 0 | ←Fig. 7A |
| −1/6 | −1/6 | −1/6 | |
| 0 | −1/8 | −3/8 | |

Note that there as before, only the bias contributions are shown. The total excitations applied are shown for the second example in Figure 7A. Figure 7A illustrates the excitation of the various cores in one plane of the three-dimensional array where none of the cores in that plane is to be selected, whereas Figure 7B shows another plane in the same array in which one of the cores in that plane is selected. It will be observed that the core in the selected plane (upper left block of Fig. 7B) receives the total excitation of one unit which is derived from the following equation: $Z_1+Y_1+X_1=1$, where the excitation on line $Z_1$ equals +½ unit; $Y_1$ equals +¼ unit; and $X_1$ equals +¼ unit. Further it will be observed from Figure 7A that the unselected core which receives the most drive in this plane is also at the upper left corner of the figure. This latter core receives +½ unit of excitation.

It is to be noted that the discrimination ratio obtainable where no bias signal is used is given by $$D=\frac{n}{n-1}$$

while the discrimination ratio obtainable as a result of the application of a bias signal to an $n$-dimensional array of storage elements in accordance with the invention results in the attainment of the discrimination ratio given by Equation 3.

It can be demonstrated by straightforward means that in an array of dimension $n$, where $n>1$, a maximum discrimination ratio is obtained when the bias has the reverse polarity of the selecting signals and has the magnitude given by (1), wherein the unit of excitation is understood to be that applied to a single selecting line. When the bias is as described, the discrimination ratio takes the value (3); we shall proceed by showing that any other value of bias leads to a discrimination ratio less than that given in (3).

First, if the bias B had the same polarity as the selecting signals, the two largest magnitudes of net excitations would be $(n+B)$ and $(n-1+B)$ in decreasing order, and the discrimination ratio would be $$\frac{(n+B)}{(n-1+B)}$$

But $$\frac{(n+B)}{(n-1+B)}$$

is definitely less than $$\frac{(n+1)}{(n-1)}$$

whenever $B>O$, hence positive biases are not optimum.

Next we consider the case of a negative bias of magnitude B less than that given in (1). The two largest magnitudes of net excitation would be $(n-B)$ and $(n-1-B)$ in decreasing order, and the discrimination ratio would be $$\frac{(n-B)}{(n-1-B)}$$

but $$\frac{(n-B)}{(n-1-B)}<\frac{(n+1)}{(n-1)}$$

whenever $$B<\frac{(n-1)}{(2)}$$

Hence negative biases smaller in magnitude than (1) are not optimum.

Lastly, we consider negative biases of magnitude B such that $$B>\frac{(n-1)}{2}$$

then it can again be shown that the discrimination ratio, which takes the value $$\frac{(n-B)}{(B)}$$

is less than the optimum value $$\frac{(n+1)}{(n-1)}$$

given in (3).

Thus the value of bias given by (1) is shown by exhaustion to give the highest discrimination ratio, namely that listed in (3).

In connection with multi-dimensional arrays, it should be noted that it is possible to achieve higher discrimination ratios when reading than when recording providing parallel read-out is permissible. For example, in the three dimensional array of Figure 3, three selection lines must be used to select a particular element for recording, and the maximum discrimination ratio obtainable is 2. In reading, however, a discrimination ratio of 3 may be achieved if only two of the selection dimensions are energized and all elements so selected are read out in parallel. In this case, the negative bias level for reading (2 selection dimensions) must be ⅓ unit, while the bias level for recording (3 selection dimensions) must be −½ unit if maximum discrimination ratios are to be obtained. Selection and non-selection signal levels must be chosen accordingly for the two conditions in the manner described above. If non-selection signals in the two selection dimensions used for reading are chosen so as to contribute a total of −⅓ unit bias, then these same non-selection levels may be used for both reading and recording. However, the selection signal levels in the two selection dimensions used for reading must be different for reading than for recording in order to obtain maximum discrimination ratios in both cases.

When parallel read out is employed, the windings associated with the otherwise unused selection dimension may conveniently be used for reading. For example, in Figure 3, if parallel read out is accomplished by energizing the lines associated with the $x$ and $y$ selection dimensions, the parallel read out signals may be taken from the lines associated with the $z$ selection dimension.

Another way of eliminating separate windings for read out is to use the windings associated with one of the selection dimensions for read out. By pulsing the lines associated with one selection dimension while the lines associated with the other selection dimension are steadily energized, the stored information will be caused to appear superimposed upon the steadily energized line. For example, the read out windings R in Figure 2 could be eliminated and the selection lines $y_1$ and $y_2$ associated with the $y$ selection dimension used for read out in the manner described above. A long pulse applied in one selection dimension overlapping short pulses simultaneously applied in the other selection dimensions may also be used instead of the steady energization mentioned above.

Note that in multi-dimensional arrays, one selection dimension may be steadily energized (or long-pulsed) and used for read out while all the other selection dimensions are pulsed. It is essential that the steady energization or long pulsing of one dimension not alone be capable of changing the state of any elements influenced; thus the selection dimension to be steadily energized or long-pulsed must be chosen in accordance with the signal levels used in the various selection dimensions. For example, in the array of Figure 5 the $y$ selection dimension lines cannot be steadily energized since the selection signal level in that dimension may be sufficient to change the state of the element to be selected without the additional signal in the $x$ dimension. Furthermore, the state of the other element associated with the same $y$ selection line might also be changed in the absence of bias from the $x$ dimension. No such difficulty arises, however, in connection with the array of Figure 5, if the lines associated with the $x$ selection dimension are steadily energized and used for read out.

Figure 8 illustrates the idealized waveforms of the driving current supplied to the $x$ and $y$ selection dimensions (e.g. in Fig. 2), as well as the idealized output waveform which can be expected in the embodiment of the invention just described. The steady or long pulse is marked $I_L$ and is applied at $Y_1$, $Y_2$, etc., whereas the overlapping short pulse is marked $I_P$ and is applied at $X_1$, $X_2$, etc. Outputs are developed as the combined currents in the $x$ and $y$ dimensions cause one selected core in the array to change magnetic state. The output signal is marked $I_O$ and appears during the overlap of currents $I_L$ and $I_P$. The output signals $I_O$ are developed across the same winding to which the long pulse or steady current is applied and in an oscilloscope display the output would appear as a depression or step. Such a step output signal may be readily detected by simple devices well-known in the electronic arts for separating the A.C. component of a signal from the D.C. component. One such simple device is shown in the publication entitled "Radar Electronic Fundamentals" (NAVSHIPS 900,016), published by the Bureau of Ships, Navy Department, in 1944, and distributed by the United States Government Printing Office. A very simple circuit comprising an R-C coupled amplifier shown in Figure 111, page 111 can be readily used to allow the step portion of the output only to be transmitted. The aforementioned circuit from "Radar Electronic Fundamentals" is given by way of example to show that the outputs on the matrix developed on the common input-output line (e.g. the $y$ dimension lines) could be easily applied via a resistance capacitive network to the input of a vacuum tube so that only the step portion of the waveform $I_O$ would cause the tube to produce an output. The devices for detecting the step outputs of the cores are shown in blocked form in Figure 2 and these elements are each marked with the letter "D." One such device D is used for each column of cores and may be selectively connected to the $y$ dimension lines (i.e. the lines receiving the steady current) via switches S if the array is operated by means of long and short pulses, whereby the need for output windings $R_{11}$, $R_{12}$, $R_{21}$ and $R_{22}$ is obviated. As illustrated in Figure 2, the detecting devices are shown in series with the windings of the $y$ lines. However, such detecting devices may readily be connected in parallel with the windings of the aforesaid lines.

The foregoing propositions presuppose a response characteristic which is symmetrical about zero excitation. In cases where non-symmetry exists, the non-symmetry may be regarded as being due to a pre-existing bias the negative of which should be added to the bias that would be required if the response characteristics were symmetrical.

While the description of the invention has referred to a core of magnetic material as a storage element, it is to be understood that this may include any geometric configuration of the magnetic material per se or of the magnetic material in combination or in association with other materials. It is further to be understood that the invention is not limited to arrays of storage elements but includes individual elements having any number of selecting means associated therewith. For example, a magnetic element may be operated as a coincidence permissive gate, "and" circuit, wherein a plurality of simultaneous excitations are required for operation. Analogous to this, a magnetic element may be operated as an inhibitory gate or as a combination permissive and inhibitory gate. Any of the individual elements of the arrays previously shown and described may be considered to fall within any of the foregoing categories; consequently, the arrays shown may be referred to for disclosures of individual elements so used. It is noted that the physical embodiment of any array need not be any regular geometric figure. For convenience only, a plane was used for discussing situations where two selecting lines were used and a cube for discussing situations where three lines were used. In this connection, it is to be noted that the selecting lines connected to a plurality of elements may connect the elements in series, in parallel or in a combination series-parallel arrangement. A group of lines none of which intersect with others of that group may be said to be associated with a particular "selection dimension"; a selection dimension may or may not correspond to a physical dimension as was stated above.

It is to be further understood that this invention is not limited in its application to magnetic materials exhibiting a nearly rectangular hysteresis loop, but is equally applicable to ferroelectric dielectric materials exhibiting dielectric ($Q-V$) hysteresis loops approaching rectangularity or in fact any materials or elements that exhibit generally rectangular response characteristics analogous to hysteresis loops of certain magnetic materials.

Response characteristic is understood to mean the variation in magnitude and polarity in one parameter exhibited by the material or element in response to variations in magnitude and polarity in another parameter.

What is claimed is:

1. In a coincident signal device comprising an element exhibiting bistable states of remanent polarization and which produces an output signal when changing state, said element having a plurality of electric input lines associated therewith, one of said input lines operating as an input-output line, means for applying a selection signal of relatively long duration to said one input-output line tending to drive said element to one stable state of remanence, and means for applying selection signals of relatively short duration to at least one of said remaining input lines tending to drive said element to said one stable state of remanence, the combination of said long and short duration signals having the effect of shifting the remanent state of said element to thereby produce an output signal on said one input-output line, and means coupled to said input-output line for detecting said output signal.

2. The device defined in claim 1 further including means for applying a bias force to at least one of the input lines tending to drive said element to a stable state of remanence.

3. The device defined in claim 1 further including means for applying a bias force to one of the input lines receiving selection signals of relatively short duration, the bias force tending to drive said element to a stable state of remanence.

4. In a coincident signal device comprising a plurality of elements exhibiting bistable states of remanent polarization and which produce an output signal when changing state, said elements being disposed in a plurality of rows and columns, a first group of electric input lines wherein a different one of the input lines of said first group is coupled to a different row of said elements, a second group of electric lines wherein a different one of the input lines of said second group is coupled to a different column of said elements for delivering a selection signal to said elements and for delivering an output signal from said elements, means for applying a selection signal of relatively long duration to one of the lines of said second group, said selection signal tending to drive said elements to one state of remanence, and means for applying selection signals of relatively short duration to one of the input lines of the first group, said selection signals tending to drive said cores to said one state of remanence, the combination of said long and short duration signals having the effect of shifting the remanent state of one selected element to thereby produce an output signal on the electric line of the second group associated with said selected element, said output signal being superimposed on said long duration signal.

5. The device defined in claim 4 including means for applying a bias force to said electric lines for driving all of said elements to a stable state of remanence.

6. The device defined in claim 4 further including means for applying a bias force to the input lines receiving selection signals of relatively short duration for driving each of said elements to a stable state of remanence.

7. A memory matrix comprising an array of magnetic cores disposed in a plurality of intersecting lines, each of said cores exhibiting two stable states of magnetic remanence and having first and second selection windings associated therewith, corresponding selection windings of the cores in a line being connected together so that each core is associated with two lines which intersect at one core, a first plurality of means for selectively applying a selection signal to the first selection winding in one line of cores tending to drive those cores to one state of magnetic remanence, a second plurality of means for selectively applying a selection signal to the other selection winding in another line of cores tending to drive the cores to said one direction of magnetic remanence, the substantially simultaneous application of selection signals from said first and second means to two different crossing lines causing the core at the intersection of said lines to be driven toward said one state of remanence, said first and second means including apparatus for applying a constant bias to every first and second selection winding in the array tending to drive said cores toward the other state of magnetic remanence, said selection signals being of such magnitude that at least two such signals applied simultaneously to said windings associated with a selected core are necessary to overcome the bias applied thereto and to cause the selected core to be driven to said one stable state.

8. A memory matrix comprising an array of magnetic cores disposed in a plurality of intersecting lines, each of said cores exhibiting two stable states of magnetic remanence and having first and second selection windings associated therewith, corresponding selection windings of the cores in a line being connected together so that each core is associated with two lines which intersect at one core, a first plurality of means for selectively applying a selection signal to the first selection winding in one line of cores tending to drive those cores to one state of magnetic remanence, a second plurality of means for selectively applying a selection signal to the other selection winding in another line of cores tending to drive the cores in said one direction of magnetic remanence, the substantially simultaneous application of selection signals from said first and second means to two different lines causing the core at the intersection of said lines to be driven toward said one state of remanence, said first means including apparatus for applying a constant bias to one of the selection windings associated with every core in the array tending to drive said cores toward the other state of magnetic remanence, said selection signals being of such magnitude that at least two such signals applied simultaneously to said windings associated with a selected core are necessary to overcome the bias applied thereto and to cause the selected core to be driven to said one stable state.

9. A memory matrix comprising an array of magnetic cores disposed in a plurality of intersecting lines, each of said cores exhibiting two stable states of magnetic remanence and having first and second selection windings associated therewith, corresponding selection windings of the cores in a line being connected together so that each core is associated with two lines which intersect at one core, a first plurality of means adapted to receive a selectively applied selection signal for transmission to the first selection winding in one line of cores tending to drive those cores to one state of magnetic remanence, a second plurality of means adapted to receive a selectively applied selection signal for transmission to the other selection winding in another line of cores tending to drive the cores in said one direction of magnetic remanence, the substantially simultaneous application of selection signals from said first and second means to two different lines causing the core at the intersection of said lines to be driven toward said one state of remanence, said first means including apparatus adapted to apply a constant bias to one of the selection windings associated with every core in the array tending to drive said cores toward the other state of magnetic remanence, said selection signals being of such magnitude that at least two such signals applied simultaneously to said windings associated with a selected core are necessary to overcome the bias applied thereto and to cause the selected core to be driven to said one stable state.

References Cited in the file of this patent

UNITED STATES PATENTS

| | | |
|---|---|---|
| 2,021,099 | FitzGerald | Nov. 12, 1935 |
| 2,691,155 | Rosenberg et al. | Oct. 5, 1954 |
| 2,734,184 | Rajchman | Feb. 7, 1956 |
| 2,736,880 | Forrester | Feb. 28, 1956 |
| 2,741,757 | Devol et al. | Apr. 10, 1956 |

OTHER REFERENCES

Journal of Applied Physics, vol. 22, number 1, Jan. 1951, pp. 44–48.

RCA Review, June 1952, pp. 183–201.

Electronics Magazine, Apr. 1953, pp. 146–149.